US011709799B2

(12) United States Patent
Huang et al.

(10) Patent No.: US 11,709,799 B2
(45) Date of Patent: Jul. 25, 2023

(54) CONTENT OR FILE BASED APPLICATION VIRTUALIZATION USING A CACHE

(71) Applicant: VMware, Inc., Palo Alto, CA (US)

(72) Inventors: Fei Huang, San Jose, CA (US); Daniel James Beveridge, Apollo Beach, FL (US)

(73) Assignee: VMware, Inc., Palo Alto, CA (US)

( * ) Notice: Subject to any disclaimer, the term of this patent is extended or adjusted under 35 U.S.C. 154(b) by 61 days.

(21) Appl. No.: 15/178,324

(22) Filed: Jun. 9, 2016

(65) Prior Publication Data
US 2017/0060605 A1 Mar. 2, 2017

Related U.S. Application Data

(60) Provisional application No. 62/211,750, filed on Aug. 29, 2015.

(51) Int. Cl.
G06F 9/445 (2018.01)
G06F 9/455 (2018.01)
G06F 16/172 (2019.01)
G06F 16/13 (2019.01)

(52) U.S. Cl.
CPC ............ *G06F 16/172* (2019.01); *G06F 9/445* (2013.01); *G06F 16/13* (2019.01); *G06F 9/45537* (2013.01); *G06F 2009/45579* (2013.01)

(58) Field of Classification Search
None
See application file for complete search history.

(56) References Cited

U.S. PATENT DOCUMENTS

| 7,340,454 | B2 * | 3/2008 | Wu | G06F 17/30864 |
| | | | | 707/711 |
| 7,461,086 | B1 * | 12/2008 | Hurren | G06F 8/61 |
| 7,484,245 | B1 * | 1/2009 | Friedman | G06F 21/52 |
| | | | | 380/283 |
| 7,512,899 | B1 * | 3/2009 | Hoiem | G06F 9/451 |
| | | | | 715/825 |
| 8,365,164 | B1 * | 1/2013 | Morgenstern | G06F 8/61 |
| | | | | 717/175 |
| 8,423,529 | B1 * | 4/2013 | Bloomstein | G06F 17/30144 |
| | | | | 707/706 |

(Continued)

FOREIGN PATENT DOCUMENTS

GB 2446176 A * 8/2008 ....... G06F 17/30855

OTHER PUBLICATIONS

Unknown, "ThinApp: Overview and Features", VMware, Inc., 2016, vmware.com/products/thinapp/, 6 pages.

(Continued)

*Primary Examiner* — Abu Zar Ghaffari
(74) *Attorney, Agent, or Firm* — Barta, Jones & Foley, PLLC

(57) ABSTRACT

Embodiments provide for application-specific provisioning of files or registry keys. As applications are installed or launched, data is recorded by an application virtualization engine, and an index is created linking the recorded data to both the application and the underlying files or registry keys. As applications are requested (e.g., launched, updated, or the like), the application virtualization engine reveals various copies of file or registry keys to the application on demand or in accordance with a policy.

19 Claims, 11 Drawing Sheets

(56) References Cited

U.S. PATENT DOCUMENTS

| | | | | |
|---|---|---|---|---|
| 8,577,940 | B2* | 11/2013 | Tormasov | G06F 16/176 707/831 |
| 8,626,723 | B2 | 1/2014 | Ben-Shaul et al. | |
| 8,700,719 | B1* | 4/2014 | Covitz | G06Q 10/107 709/206 |
| 9,100,246 | B1* | 8/2015 | TeNgaio | H04L 29/08099 |
| 9,286,098 | B1* | 3/2016 | Baimetov | G06F 9/45533 |
| 9,395,979 | B1* | 7/2016 | Bullukian | G06F 8/71 |
| 9,424,058 | B1* | 8/2016 | Wasson | G06F 9/45558 |
| 9,454,537 | B2* | 9/2016 | Prahlad | G06F 17/302 |
| 9,455,914 | B2* | 9/2016 | Singh | H04L 47/2441 |
| 9,588,790 | B1* | 3/2017 | Wagner | G06F 11/3668 |
| 9,749,342 | B1* | 8/2017 | Krage | H04L 63/1425 |
| 9,996,428 | B2* | 6/2018 | Nallathambi | G06F 3/0619 |
| 10,061,701 | B2* | 8/2018 | Duimovich | G06F 12/084 |
| 2003/0188024 | A1* | 10/2003 | MacPhail | G06Q 30/02 709/246 |
| 2005/0216788 | A1* | 9/2005 | Mani-Meitav | G06F 11/1456 714/6.32 |
| 2006/0248067 | A1* | 11/2006 | Brooks | G06F 17/30091 |
| 2007/0067382 | A1* | 3/2007 | Sun | G06F 12/0862 709/203 |
| 2007/0198656 | A1* | 8/2007 | Mazzaferri | G06F 3/1415 709/218 |
| 2007/0271570 | A1* | 11/2007 | Brown | G06F 9/5033 718/105 |
| 2009/0055571 | A1* | 2/2009 | Budko | G06F 21/53 711/6 |
| 2009/0282231 | A1* | 11/2009 | Nomoto | G06F 17/30067 713/1 |
| 2010/0023582 | A1* | 1/2010 | Pedersen | H04L 67/06 709/203 |
| 2010/0064373 | A1* | 3/2010 | Cai | G06F 21/6254 726/26 |
| 2010/0313079 | A1* | 12/2010 | Beretta | G06F 9/5055 714/48 |
| 2012/0151469 | A1* | 6/2012 | Wookey | G06F 8/658 717/174 |
| 2012/0174096 | A1 | 7/2012 | Conover | |
| 2012/0203807 | A1* | 8/2012 | Larimore | G06F 9/45537 707/827 |
| 2013/0275978 | A1* | 10/2013 | Jacobson | G06F 8/61 718/1 |
| 2013/0339945 | A1* | 12/2013 | Malyshev | G06F 8/60 717/177 |
| 2014/0149794 | A1* | 5/2014 | Shetty | H04L 67/1095 714/20 |
| 2014/0180961 | A1* | 6/2014 | Hankins | G06Q 10/10 705/348 |
| 2015/0012571 | A1* | 1/2015 | Powell | G06F 17/30235 707/827 |
| 2015/0074116 | A1 | 3/2015 | Huang | |
| 2015/0074536 | A1* | 3/2015 | Varadharajan | G06F 17/30233 715/734 |
| 2015/0121059 | A1 | 4/2015 | Davis | |
| 2015/0212893 | A1* | 7/2015 | Pawar | G06F 11/1456 707/649 |
| 2015/0254455 | A1* | 9/2015 | Sandhu | G06F 9/455 726/29 |
| 2016/0057196 | A1* | 2/2016 | Bentley | G06F 3/04842 715/738 |
| 2016/0210203 | A1* | 7/2016 | Kumarasamy | G06F 3/061 |
| 2016/0210342 | A1* | 7/2016 | Vallabhaneni | G06F 17/30575 |

OTHER PUBLICATIONS

Unknown, "Deliver secure virtual apps and desktops", Citrix Systems, Inc., captured Jun. 8, 2016, www.citrix.com/products/xenapp-xendesktop/, 6 pages.

Unknown, "Introducing FSLogix Apps 2.0", FSLogix, Inc., captured Jun. 8, 2016, fslogix.com/products/fslogix-apps, 4 pages.

Unknown, "App Volumes: Overview and Features", VMware, Inc., 2016, vmware.com/products/appvolumes, Overview and Features, 9 pages.

Unknown, "Docker: Build, Ship, Run", Docker, Inc., 2016, docker.com/products/docker-cloud, 8 pages.

\* cited by examiner

CONTENT OR FILE BASED APPLICATION VIRTUALIZATION USING A CACHE

BACKGROUND

Traditional application virtualization focuses on application isolation, allowing software to be encapsulated from the underlying operating system while still executing and operating as though the application is fully installed. Application virtualization makes it is possible to achieve user workload/ workspace mobility, single copy application management (update, patch etc.), application life circle management, usage auditing and facilitated the non-persistent virtual desktop interface model which lacked the ability to maintain a user's unique application requirements when leveraging a shared operating system image.

The cloud (public or hybrid or private) is the trend in computing, and there is a strong need for application virtualization which fits the cloud environment. However, existing application virtualization methods, such as ThinApp by VMware, Inc., XenApp by Citrix, FsLogix Apps, AppVolumes by VMware, Inc., and Docker, are not always effective for operating in a cloud environment, nor are server applications.

SUMMARY

Aspects of the disclosure provide application virtualization, by intercepting a request for a file or registry key from at least one of a plurality of applications, and searching a look-aside cache for the intercepted file or registry key. If the intercepted file or registry key is in the look-aside cache, a filter is adjusted to reveal a cached copy of the file or registry key to the at least one of the plurality of applications. Otherwise, the file or registry key is retrieved from underlying storage, and the look-aside cache is updated with the retrieved file or registry key.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
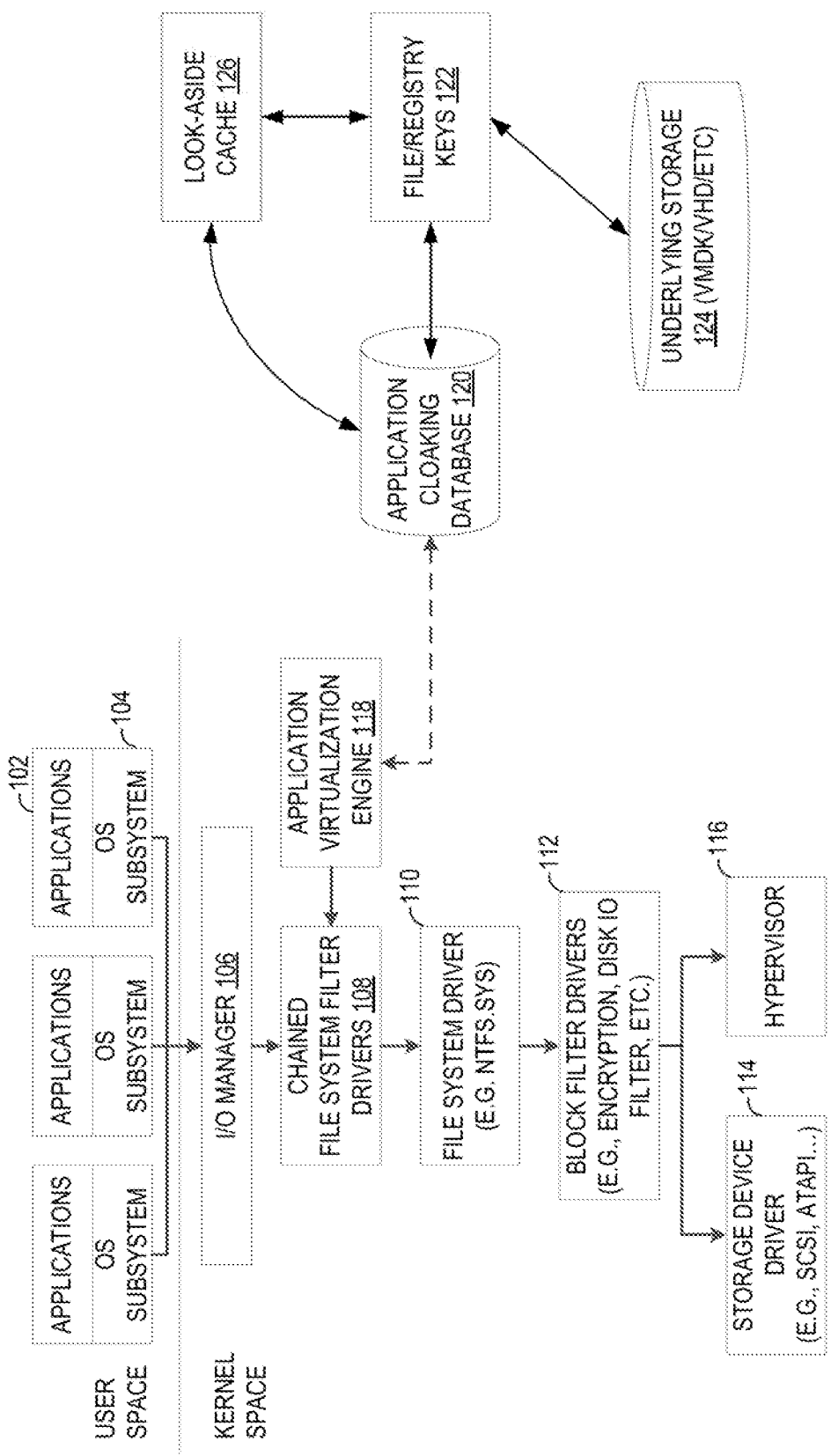
FIG. 1 is a block diagram of a system performing content or file based application virtualization.

Components of an application include content, files, and other data. Existing systems stream or download components of each application to a device or other endpoint. However, some components of an application are often duplicates of components of other applications (e.g., duplicate files may exist in different application packages such as runtime libraries). Downloading all these duplicate components to the endpoint decreases performance. Further, not all the components necessarily need to be delivered.

Aspects of the disclosure provide a view of a set of files or other components which the user may execute or access. Underlying this view, an application virtualization engine composes, manages, swaps, and/or patches individual files while maintaining a persistent view to the end user. With the disclosure, the application becomes a virtual view to the user, while the files of applications are real files in a system drive, and/or streamed as resources from a share, and/or a link clone provided by a hypervisor. In some examples, aspects of the disclosure provide zero copy instantiation of applications, on demand.

Some examples of an application virtualization engine of the disclosure leverage existing technology, such as App Volumes and VirtualApps, by VMware, Inc., to change the way in which the operating system sees and interacts with the files related to a given application. In one example, to deliver an application to an end user and make the application functional, the disclosed method composes a specific view of a subset of files out of the set of all files. This view is composed by recording files or registry keys accessed by the application on installation or launch, indexing those files or registry keys in a database, and then pre-loading the files or registry keys into a look-aside cache. The present disclosure uses a filtering mechanism that is modified dynamically to rapidly give the operating system a new view of the files which are present and available in support of different applications. The actual files associated with a given application are not needed until the application is opened, but the challenge is to dynamically deliver the needed files fast enough that no delay is perceived by the user. By using dynamic disk attaching technology as a delivery vehicle for application content, aspects of the disclosure dynamically deliver content to the operating system at a storage level and to the registry and file system within the operating system using the notion of dynamic filters.

In this manner, applications and data seamlessly (e.g., without user input) follow users and their devices, across various modes of application interaction across a range of devices. Further, aspects of the disclosure provide a seamless user experience for delivering application content, and for transitions with location, tools, and environment changes, while minimizing bandwidth use and calls to underlying storage. Because the application is broken into files, the cloud is able to deliver portions (e.g., files) on demand.

The disclosed method saves space in cloud storage. Files or registry keys or other configuration data which have already been retrieved are not retrieved again, but rather the second and subsequent application or user to request the file is pointed to the first retrieved file or registry key. Thus, less memory is used by the cloud storage, or local storage, and less bandwidth, time, and processing power is utilized for retrieving files and registry keys from storage.

Aspects of the disclosure are not limited to operation with registry keys. Rather, the disclosure is operable with any type, form, and content of configuration data.

Further, auditing of application usage may be granular, tracking the access patterns of files accessed across applications. This level of information helps application management, statistics report, license control, and the like. Additionally, the usage data is used to analyze and correlate the data, producing blueprints for efficient storage cache pre-population based on frequently used files.

The disclosed system and method improve security, at least because key files are made read-only while allowing others to be read-write. Source files may also be physically distributed for resiliency and recovery.

The disclosed system and method also results in overall cost savings. A pool of generic remote desktop session hosts (RDSH) servers are able to provide each user a customized view of available applications which previously required many small 'pods' of RDSH server with differing application suites installed. In addition to cost savings, the live-update features allow better agility and smaller maintenance windows than previously possible.

Improving Application Performance Using Dynamic Filters

Applications contain groups of files. Across different application packages there are many duplicate files present. Examples of such duplication include the application run time library. If an application is decomposed into file based components, there may be less effort needed to deliver an application into the desktop of a user, such as only a few small files instead of a much larger package. For example, to execute an application or a portion thereof (e.g., menus), only some executable files and their associated configurations are retrieved.

Whether an application package is streamed, downloaded, or more dynamically injected, aspects of the disclosure present the application as though it were installed in the traditional way. For example, Docker uses a container concept, which is wrapping up applications into standard containers that plug seamlessly into the OS, while keeping the application logically decoupled from the operation system, and thus portable. However, these kinds of container and traditional application virtualization technologies, like ThinApp and App-V by Microsoft Corporation, transfer each application separately into the operating system either by a streaming or copying method. These existing methods result in a substantial utilization of resources in the process of application delivery.

The application virtualization engine herein described may compose, manage, swap or even patch individual files while still maintaining a persistent view to the end user. This is accomplished by decoupling the content offered by the storage subsystem from the content perceived by the file and registry keys of the operating system. Usually the content offered by the storage system and the content seen by the file and registry systems within the operating system are one and the same. However, by adjusting a set of file system and registry virtualization filters, aspects of the disclosure control the visibility of files and application content provided by the underlying disk subsystem to the operating system. In some examples, the design does not rely on containers which need to be transmitted into the operating system. Instead, applications themselves are dynamically instantiated as a virtual view filesystem and registry content which may be unique to each user. The file and registry content, which are visible to a given user within the operating system, are an amalgamation of real files in a system drive, a streamed resource from a file share, or, in some examples, derived from content presented to the operating system by way of a synthetic block device disk provided by a hypervisor or advanced storage system (which is itself based on diverse underlying sources). This collection of virtual files is organized together to become a usable application to each user. The application virtualization engine is a new layer of abstraction or virtualization which interposes itself between the contents offered by the disk subsystem of the operation system and the contents visible in the user context within said operating system.

FIG. 1 is a block diagram of an example system performing the disclosed application virtualization. FIG. 1 illustrates a traditional operating system (OS) file system component architecture, communicating with the application virtualization engine, which is in turn connected to the applications cloaking database, the file or registry keys, and finally the underlying storage. The disclosed system is functional with any operating systems, such as Linux and WINDOWS brand operating systems, including any embedded operating systems.

Applications 102 are executed in the user space. The applications 102 are run, in the illustrated example, by the OS environment subsystem 104. Although the disclosed system illustrates the OS environment subsystem 104, other subsystems such as OS/2, Interix, or POSIX are contemplated. The applications 102 and their associated OS environment subsystems 104 communicate with the I/O manager 106 operating in the kernel space. In a typical file system architecture, the I/O manager 106 communicates with the chained file system filter drivers 108, which communicate with the file system driver 110, which is connected to the block filter drivers 112, which are connected to both the storage device driver 114 and the hypervisor 1110 (described in more detail in FIG. 11).

In some examples, the disclosed application virtualization engine 118 operates as part of the kernel space, communicating with the chained file systems filter drivers 108, in some examples the I/O filter driver (not illustrated). The application virtualization engine 118 is a software client which filters the file I/O and/or registry I/O. In some examples, part of the application virtualization engine 118 sits inside the OS kernel, but part of it, in some examples, resides in user-space as an OS service which plays a coordination role with the portions inside the OS kernel. In some examples, the application virtualization engine 118 redirects the file access to the right location or triggers an instant bits delivery when needed. The application virtualization engine 118 further communicates with the application cloaking database 120 (illustrated and described in more detail in FIG. 2). The application cloaking database 120 records all files or registry keys which are associated with the applications operating in the user space. The application cloaking database 120 maps the applications 102 and their respective file or registry keys. In some examples, the mapping is recorded in a database, a list, a matrix, an array, or any other logical storage construct. The mapping, in turn, points, connects or otherwise communicates with the file or registry keys 122, which are connected to the underlying storage 124 (illustrated in more detail in FIG. 2).

A look-aside cache 126 stores the files or registry keys which are retrieved from underlying storage 124. In some examples, the look-aside cache includes a hash of the file or registry keys, and the retrieved files or registry keys are stored as part of a key-value table, array, matrix, etc. For example, the hash of the file test.dll is the key which points to the file test.dll. In the example of the key-value table, the records are indexed by the hash of a block of the data (e.g., the hash of the block of data is the key), and the value associated with the hash of the block of data is the reference count for that block of data, and its address in storage (e.g., HashOfData→<Data>). Before the application virtualization engine 118 retrieves a file or registry key from the underlying storage 124, the look-aside cache 126 is checked to ensure that no file or registry key is unnecessarily retrieved when it is already in memory.

Figure 2:
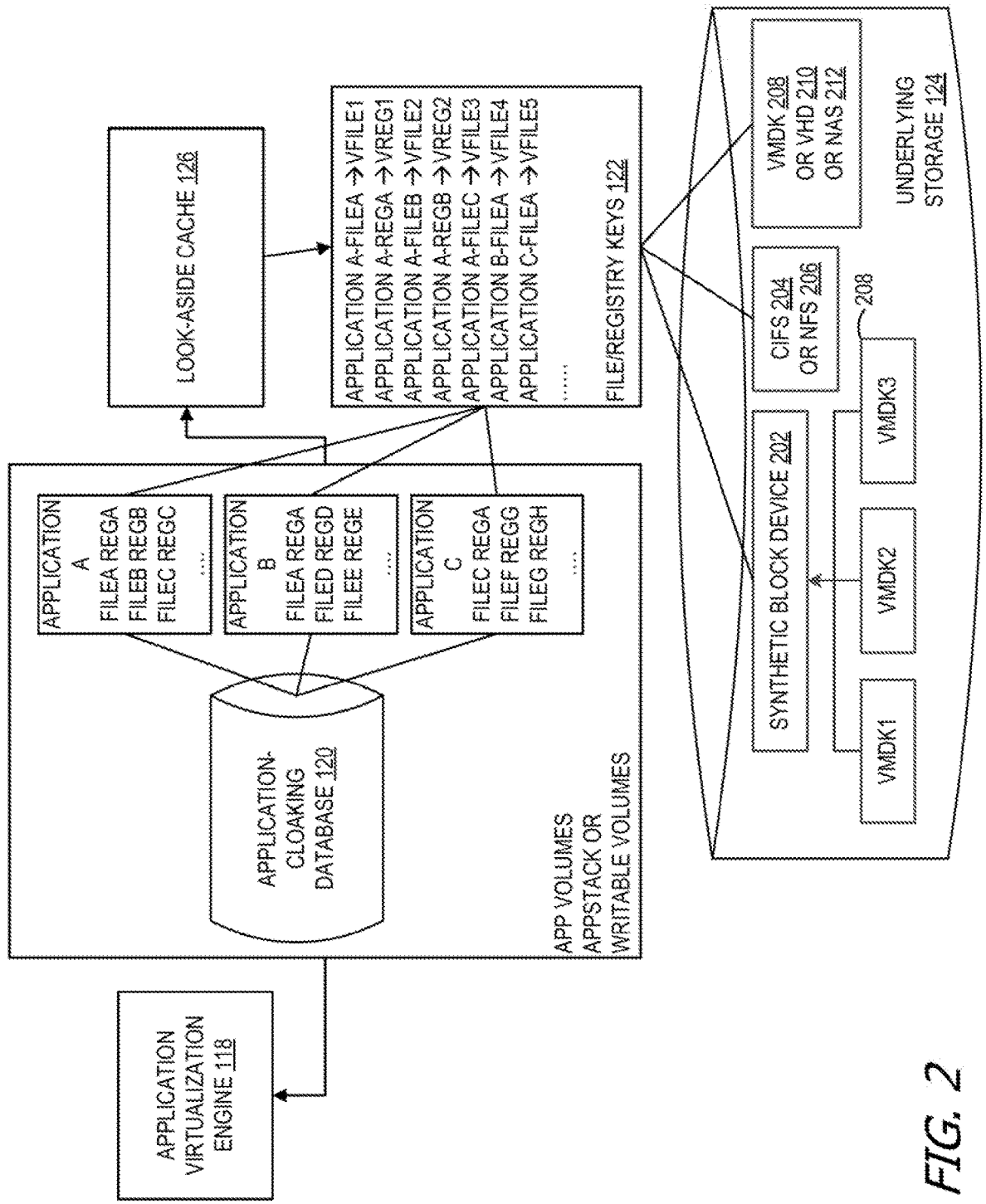
FIG. 2 is a block diagram of the application virtualization engine and the associated application cloaking database.

FIG. 2 is a block diagram of the application virtualization engine 118 and the associated application cloaking database 120. The application cloaking database 120 records all files associated with or belonging to applications, allowing for the virtualizing of the mappings of files and registry keys. In some examples, the application cloaking database 120 is a database or other structure that tracks the virtual file to real file mappings and knows where to retrieve underlying application content. It also, in some examples, contains integrity information about the application 102 files, the best fit storage locations to retrieve the bits, etc. To improve processing speeds, reduce transmission bandwidth, and otherwise improve performance, the look-aside cache 126 is used for in-line deduplication of files or registry delivered to the applications 102. In those examples, as a file is requested by an application 102, the source file is hashed when it is pulled the first time, and the hash of the file and the associated file are stored in the look-aside cache 126. The hash is, in some examples, block or file based. Each time that a file is requested by the same application 102, or another application 102, the look-aside cache 126 is checked for that file. If the file is located in the look-aside cache 126, the file is not retrieved from the underlying storage 124, but rather it is just retrieved from the look-aside cache 126 in memory. In some examples, the same file is only pulled once, as deduplication happens at transmission level. This method is illustrated and described in FIG. 3.

Some examples of underlying storage 124, as illustrated in FIG. 2, include a synthetic block device 202, such as a virtual machine disk (VMDK) 208, a network file system (NFS) 206, common internet file system (CIFS) 204, virtual hard drive (VHD) 210, or network-attached storage (NAS) 212. In some examples, the application cloaking database 120 is sourced across one or more underlying disk volumes in the underlying storage 124. Alternatively, the application cloaking database is sourced on a synthetic block device 202.

Remote Desktop Session Host Environment Multi-User Virtual Desktop Interface

In some examples, different users have different sets of applications 102 in a remote desktop session host (RDSH) environment. The disclosed system and method of application virtualization permits different run-time session users to only see their assigned applications 102 but not the applications 102 of other users. Alternatively, the disclosed system and method permit multiple remote desktop sessions to utilize the same file and registry keys, although they appear to be distinct.

Additionally, the duplicate files shared by multiple applications 102 have one single copy underneath across all users and attached applications. For example: application A and application B both use test.dll as a common library, this test.dll is packaged separately in the volumes of both A and B, since they are provisioned as two different appstacks/volumes. Traditionally, application volumes A and B would each deliver a separate copy of test.dll even though test.dll contains the exact same content for both applications 102. The disclosed system and method recognizes that test.dll is the same file, utilized by both applications 102 A and B. The dynamic filters are then adjusted so that both applications 102 point to a single copy of test.dll. This reduces the burden of delivering the file twice to the operating system, saving resources and improving performance. Furthermore, each user has their own unique view of which applications 102 are installed and available within a multi-user operating system, such as Microsoft 2012 operating in Remote Desktop Services multi-user mode. This is functionality not possible with prior application virtualization approaches or with current container based application delivery.

In some examples where duplicate files or registry keys are shared by multiple applications 102 or virtual desktop sessions, the underlying file or registry keys are represented as residing in more than one location on the underlying storage 124, while only one copy is maintained. This allows for a form of deduplication as fewer copies of the same data need to be maintained, since the application cloaking database 120 maintains an index, in some examples, of where the single copy of the file or registry key used by all applications 102 is located.

Figure 3:
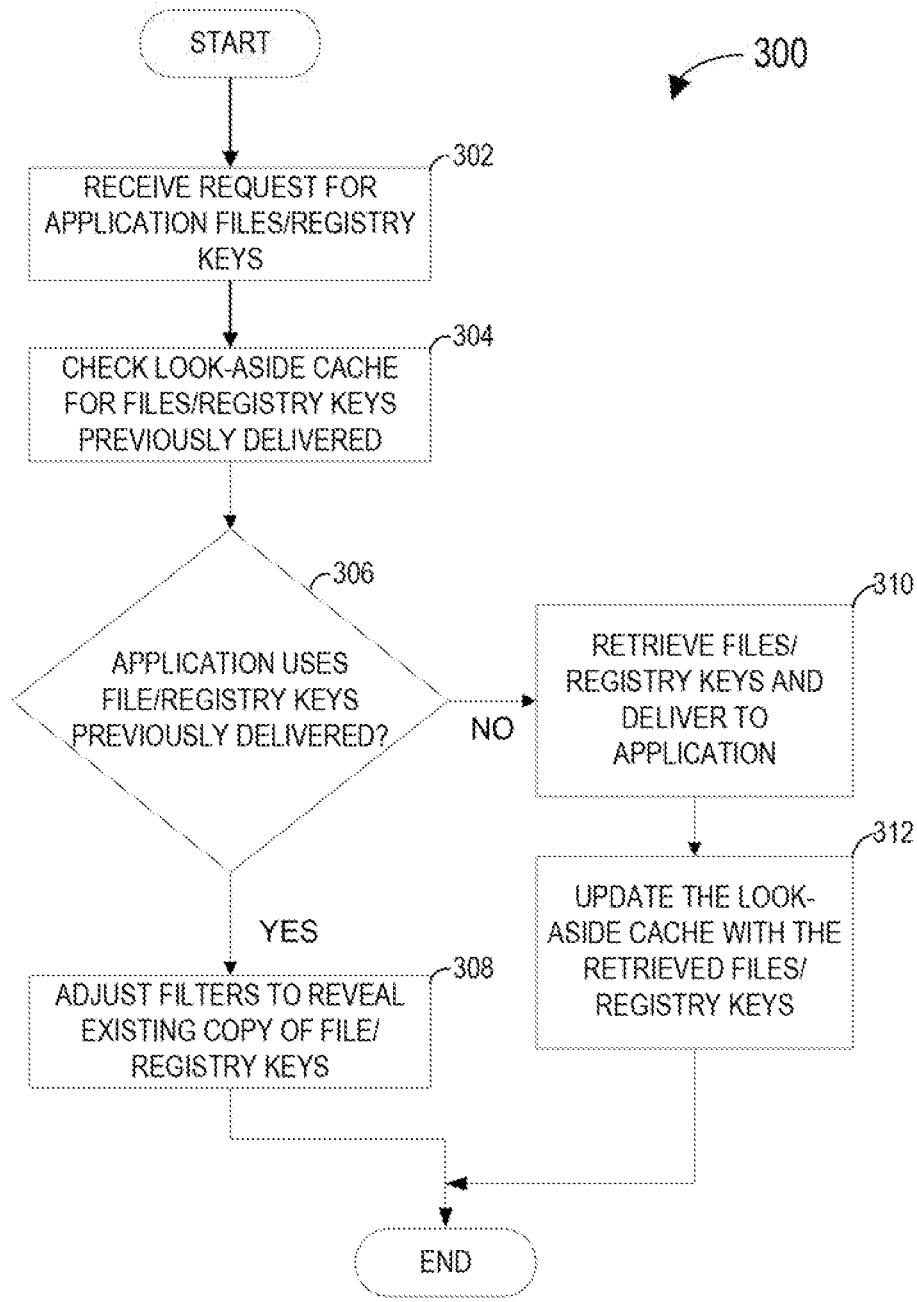
FIG. 3 is a flowchart of an example method for filtering files and/or configuration (e.g., registry) keys as performed by the application virtualization.

FIG. 3 is a flowchart of an example method for filtering files and/or registry keys as performed by the application virtualization. At 302 the application virtualization engine receives or intercepts a request for a file or registry key from an application which is loaded, launched, or running.

In some examples, the request is transmitted by an application capture tool (not illustrated). In that example, the application capture tool initially operates as applications 102 are installed. In some examples, the application capture tool interacts with application virtualization engine 118. The application capture tool notifies the application virtualization engine 118 that an application 102 is installed or has launched. In response, the application virtualization engine 118 switches to record mode, as appropriate when installing, and indexes and converts the data from the application 102 installations into a light-weight database (e.g. the application cloaking database 120) which contains an application 102 manifest or mapping. In some examples, the application capture tool triggers this activity by activating the application virtualization engine 118. In other examples, the application capture tool performs this activity. The application capture tool is, in some examples, stored and distributed with the application files.

If multiple application cloaking databases 120 are created in the launch or operation of multiple applications 102, those application cloaking databases 120 are, in some examples, merged into a single in-memory application cloaking databases 120 which actively controls the routing of file requests between the calling application 102 and the underlying sources. The additional application cloaking databases 120 are, in some examples, children databases, in-memory application cloaking databases 120 tables, etc. and are merged into a master or parent application cloaking databases 120. In the example where a master application cloaking databases 120 is created, the master application cloaking database 120 routes the file or registry key requests between the application 102 and the underlying storage 124.

At 304, the application virtualization engine 118 checks the look-aside cache 126 to see if the requested file or registry key has previously been retrieved and is cached. In some examples, the look-aside cache 126 maintains a key-value table, tracking files and/or registry keys which have been retrieved where the key is a hash of the file/registry key or a block of data, and the store is the file, registry key, or block of data. In examples where a key-value table is maintained, the hash of the requested file or registry key is calculated before searching the look-aside cache 126.

If, at 306, the hash of the file or registry key is located in the look-aside cache 126, then the file or registry key has been previously delivered. In that case, the application virtualization engine adjusts the dynamic filters to reveal the existing copy of the file or registry key to the application 102 requesting that file or registry key. If, however, the file or registry key has not been previously delivered at 306, then the file or registry key is retrieved and delivered to the application 102 at 310. Upon retrieving the file or registry key, the look aside cache 126 is updated at 312 with the retrieved file or registry key. In some examples, the hash of retrieved content is calculated and placed alongside the file/registry key, and in other cases, the pre-existing hash value of the content is inserted into the look aside cache. Updating the look-aside cache 126, in some examples, includes mounting the file or registry keys from the underlying storage device 124. In some examples, adjusting the filter includes concealing copies of a file or registry key. For example, if multiple versions of the same application 102 are operating on different virtual desktop sessions, the file or registry keys of newer versions are concealed from an older version. Similarly, due to security reasons some files or registry keys are concealed.

Population of the Application Cloaking Database

Figure 4:
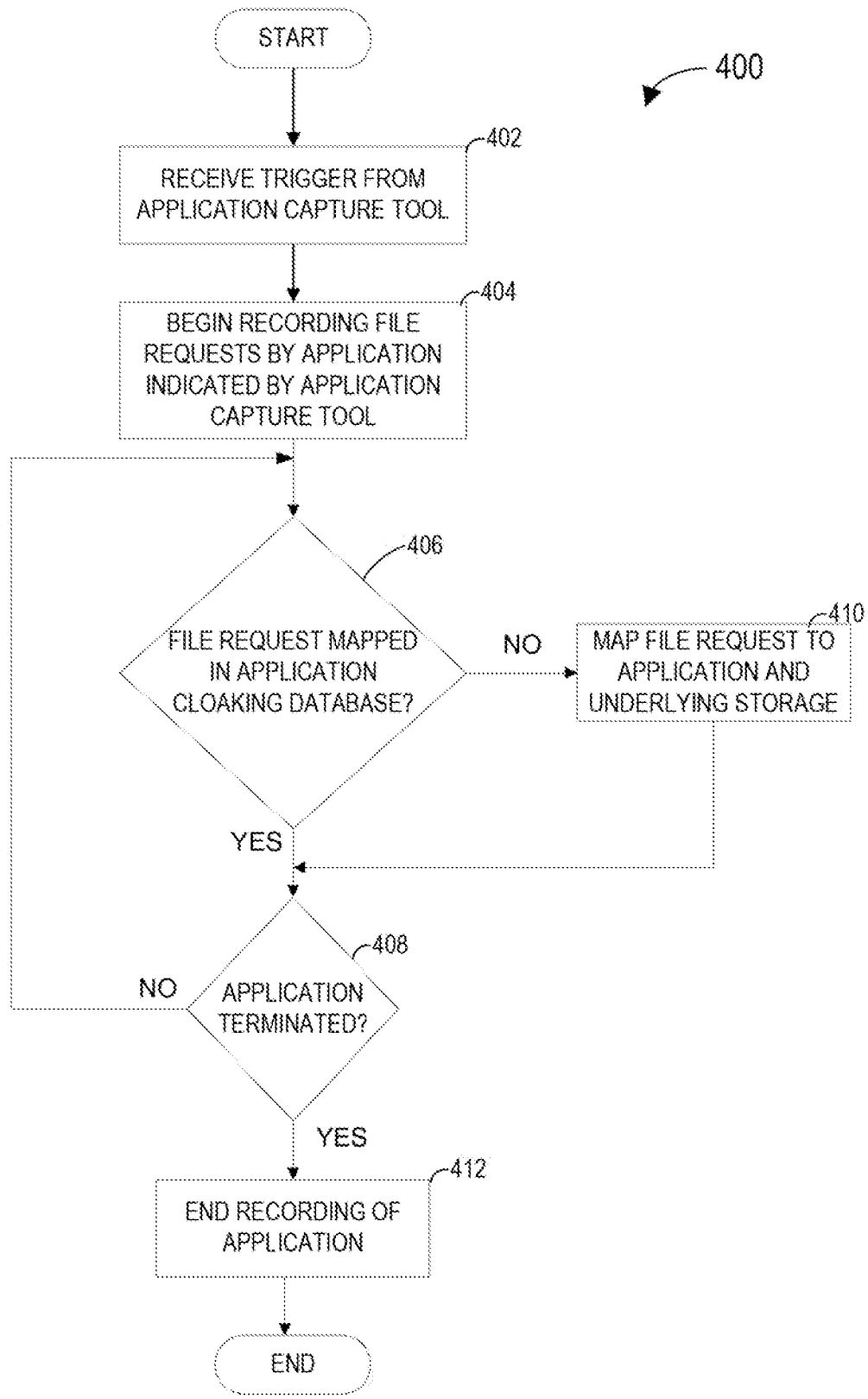
FIG. 4 is a flowchart of an example method of populating the application cloaking database.

FIG. 4 is an example flowchart of the method of populating the application cloaking database 120. At 402, the application cloaking database 120 receives a trigger or trigger event from the application capture tool. The trigger event is a notification that an application 102 requires monitoring. In some examples, the trigger event occurs when the application capture tool detects that an application 102 is being installed, launched, run, updated, changed, customized, etc. (e.g., an application event is occurring). The application cloaking database 120 begins to record the file requests generated by the application 102 identified by the application capture tool (the target application) at 404.

At 406, if the file requests from the target application 102 are not already mapped in the application cloaking database 120, then the application cloaking database 120 maps the file requests to their corresponding target application 102, and to the corresponding underlying storage 124 where the file (or registry key) is located at 410. Mapping the file request into the application cloaking database further includes indexing the file request, or its recorded data. Indexing the recorded data further involves determining or identifying which of the applications 102 share common recorded data. Creating an index of the common recorded data, in some examples, permits a form of deduplication as only one copy of a file or registry key need be maintained for multiple applications 102.

At 408, if the file request was already mapped, the application cloaking database 120 evaluates whether the application 102 is terminated. If terminated, then the application cloaking database 120 ends its recording of the target application 102. Otherwise, the application cloaking database 120 continues recording the file requests, and mapping them to the underlying storage 124 until the target application 102 has terminated.

In-Place File Change/Update for VDI Environment—Live Application Updates

The disclosed application virtualization engine 118 and the associated system also enables updates to be made live, in-place, and with limited or no down-time. Using the disclosed method, the application virtualization engine 118 changes the dynamic filter to enable an application 102 to access files or registry keys which are updated or changed, or to replace an application 102 with an entirely different application, with no impact on the user experience. In some examples, the application virtualization engine 118 maintains a mapping between application 102 files or registry keys and their corresponding real location in the underlying storage 124. The application virtualization engine 118 tracks usage of every file or registry key, allowing in-place updates and changes to the application 102. When an application 102 needs to be updated to a newer version or changed out completely, the disclosed system tracks the usage of each file or registry key that needs to be updated that is associated with the target application 102.

Figure 5:
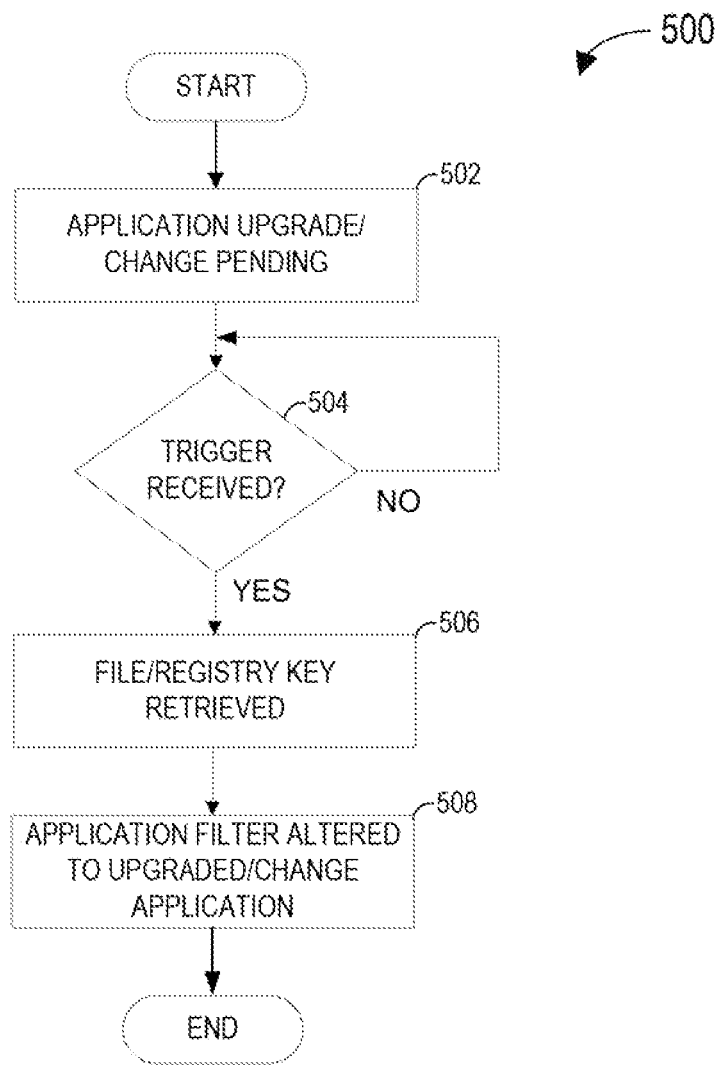
FIG. 5 is a block diagram of an exemplary flowchart for updating or changing an application in place.

FIG. 5 is a block diagram of an exemplary flowchart for updating or changing an application 102 in place. At 502, an application 102 upgrade or change is pending. In some examples, an administrator installed the updated, changed, or in some examples replacement files or registry keys. In that example, the application 102 upgrade or change is federated across all users when a trigger or trigger event is received. At 504, the trigger is received. In some examples, the trigger for updating or changing the application 102 is that a user ends their session, terminates the application 102, or in some examples the user, the machine, or the application 102 are idle. Idleness may be determined by user activity such as I/O input, mouse activity, keyboard activity, etc. In other examples, idleness is determined by an absence of CPU activity by the application 102 or the machine. Alternatively, or in addition, idleness may be evaluated by the passage of time. For instance, after a period of no activity from the user for ten minutes, the user is considered idle. Idleness, or any trigger, may be established by the administrator.

Once the virtual desktop interface (VDI) user closes or terminates the application 102, or another trigger is received at 504, the application virtualization engine 118 notifies the management console that an update or change can be made. The management console orchestrates the acquisition of the updated application 102 content from underlying storage 124 at 506. In some examples, retrieving the file or registry key at 506 involves updating the look-aside cache 126, updating the application cloaking database 120, or both.

After retrieving the updated application 102 content from the underlying storage 124, the application virtualization engine changes the dynamic filter to permit the application 102 to access the new version of the file or registry key in the mapping immediately upon the existing application 102 session closing all associated files and registry keys at 508. The management console may trigger mounting of a new VMDK which contains the updated application 102 content as needed in readiness for the application virtualization engine 118 switching into the new version of the application 102.

The new application content may be mounted on a new VMDK either prior to or after a user closes their existing application 102. This enables run-time in-place application 102 upgrades. This instant application 102 update capability does not require that VDI users terminate or log-out of their sessions in order to update applications 102.

Synthetic Block Device Disk from Multiple Sources

The disclosure may also be used with technology for aggregating virtual disks into a single synthetic VMDK, such as Synthetic Block Device (SBD) technology, by VMware, Inc. With SBD technology or similar disk aggregation technology, SBD disks are generated in advance by specifying which source VMDK disk will be represented therein.

In the RDSH use-case, SBD-type technology offers a means of providing a large number of applications 102 to the RDSH server while relying on the application virtualization engine 118 to provide a virtual view for each RDSH user that actively filters out all applications offered by the SBD except those which are assigned to the user. The combination of SBD and the application virtualization engine 118 provide a novel solution for delivery and management of virtualized applications 102 in the RDSH contest within the virtualized datacenter. SBD allows for applications 102 to be packaged such that only one application 102 is embedded on a given source VMDK yet arbitrary aggregations of applications 102 may be offered to RDSH virtualized servers using VMDK sources which, in some examples, span multiple physical storages volumes and devices. The atomic packaging methodology avoids packaging the same applications 102 multiple times for the servicing of different departmental VMDKs and SBD allows this benefit without incurring multiple disk mount operations (one per application 102). The use of SBD with the application virtualization engine 118 reduces or eliminates the application files being transferred into the operating system, speeds up deployment, and enables the improved packaging methodology.

Furthermore, this technology may be applied to enable the virtualization engine to transform applications 102 from static files to a virtual view of a set of files from different sources. It is this dynamic filtering offered by the application virtualization engine 118 that allows applications 102 to become abstractions of the underlying content.

User Environment Management

The increased usage of VDI technology results in users accessing content via an assortment of user interfaces, from an array of locations, and at variable times. The disclosed system and method of application virtualization responds to these variables to present the user with a tailored experience upon connection. This form of user environment management (UEM) provides the user with a persistent experience that is tailored to their identity across VDI, RDSH, and physical desktops, and permits administrators to push a just-in-time desktop architecture in which the underlying virtual machine (VM) container itself is completely ephemeral and single-use.

Figure 6:
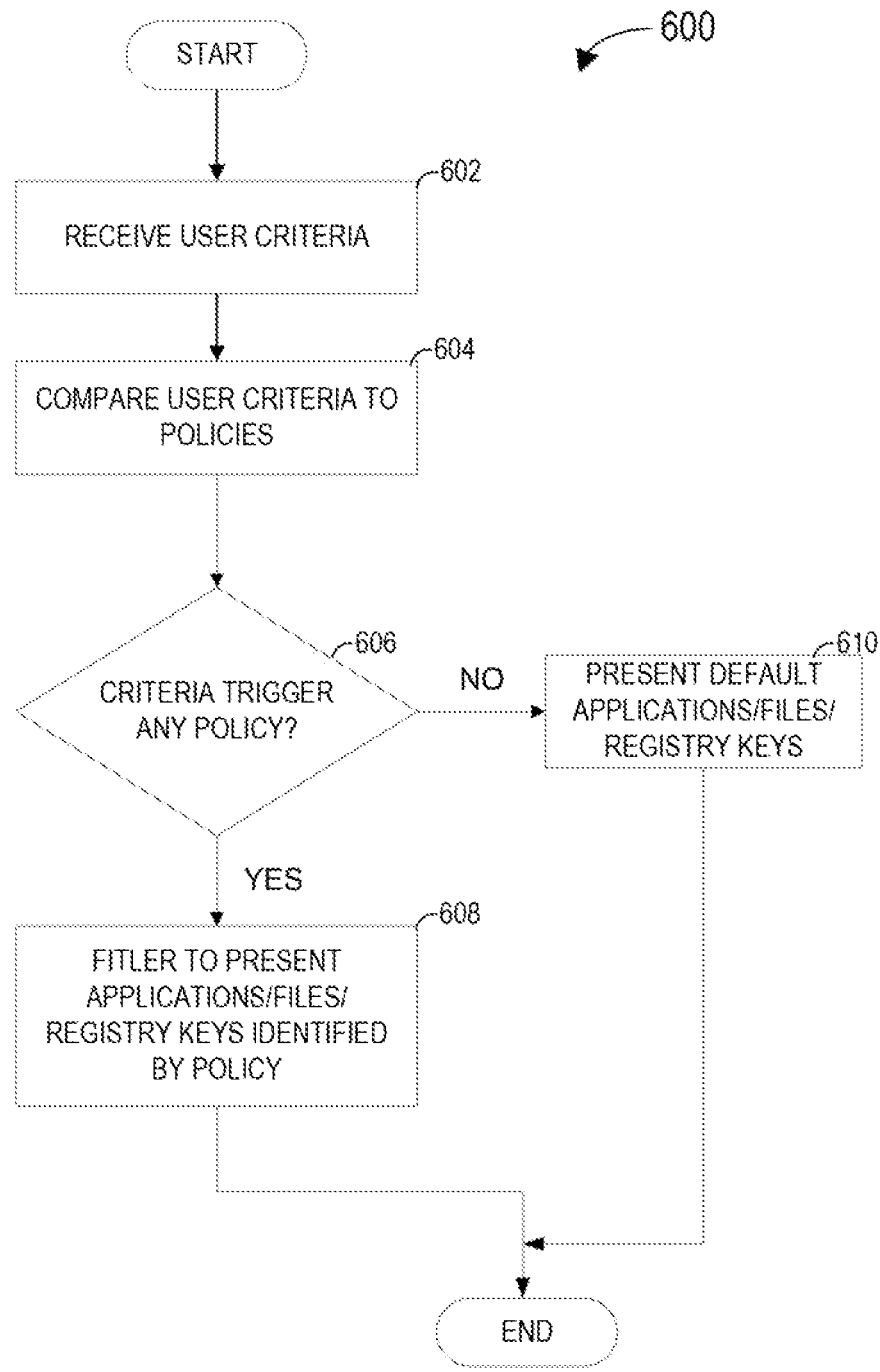
FIG. 6 is an example flowchart of a method of providing user environment management in response to detected user criteria.

FIG. 6 is an example flowchart of the method of providing UEM in response to detected user criteria. In the example of FIG. 6, the application virtualization engine 118 receives user criteria at 602. In some examples, an application capture tool collects the user criteria. In other examples, the criteria are self-reported by the user, captured by the application virtualization engine 118, etc. User criteria includes, in some examples, where the user is logging in from (public or private, from home, from a secure or unsecure network, etc.), what time the user is logging in (during work hours, when customers are accessing resources, etc.), what type of device the user is working from (a tablet, a desktop, a mobile device, etc.), or any other criteria that influence the user experience. In other examples, user criteria or other criteria established by the administrator includes: user identity, time of day, day of week, software license compliance, current load levels on underlying infrastructure, network location of end user, country and other filtering criteria which may be used to either show or hide a given application from one or more users using the operating system.

At 604, the user criteria are compared to policies federated by the administrator. An example policy includes changing application versions based upon the policy, or in response to the context of the user. If there are any policies triggered by the user criteria at 606, then the application virtualization engine 118 dynamically filters the applications, files, or registry keys supplied to the user and his applications 102. As a further example, proprietary business documents are accessible from resources affiliated with the business, but not from the home computer of a user. Policies also include security settings, changing filtering for a given application 102 based on its permitted access to files or registry keys. In the event that no specific policy applies to the supplied user criteria, then the default applications 102, files, or registry keys are presented to the user and his applications 102.

Figure 7:
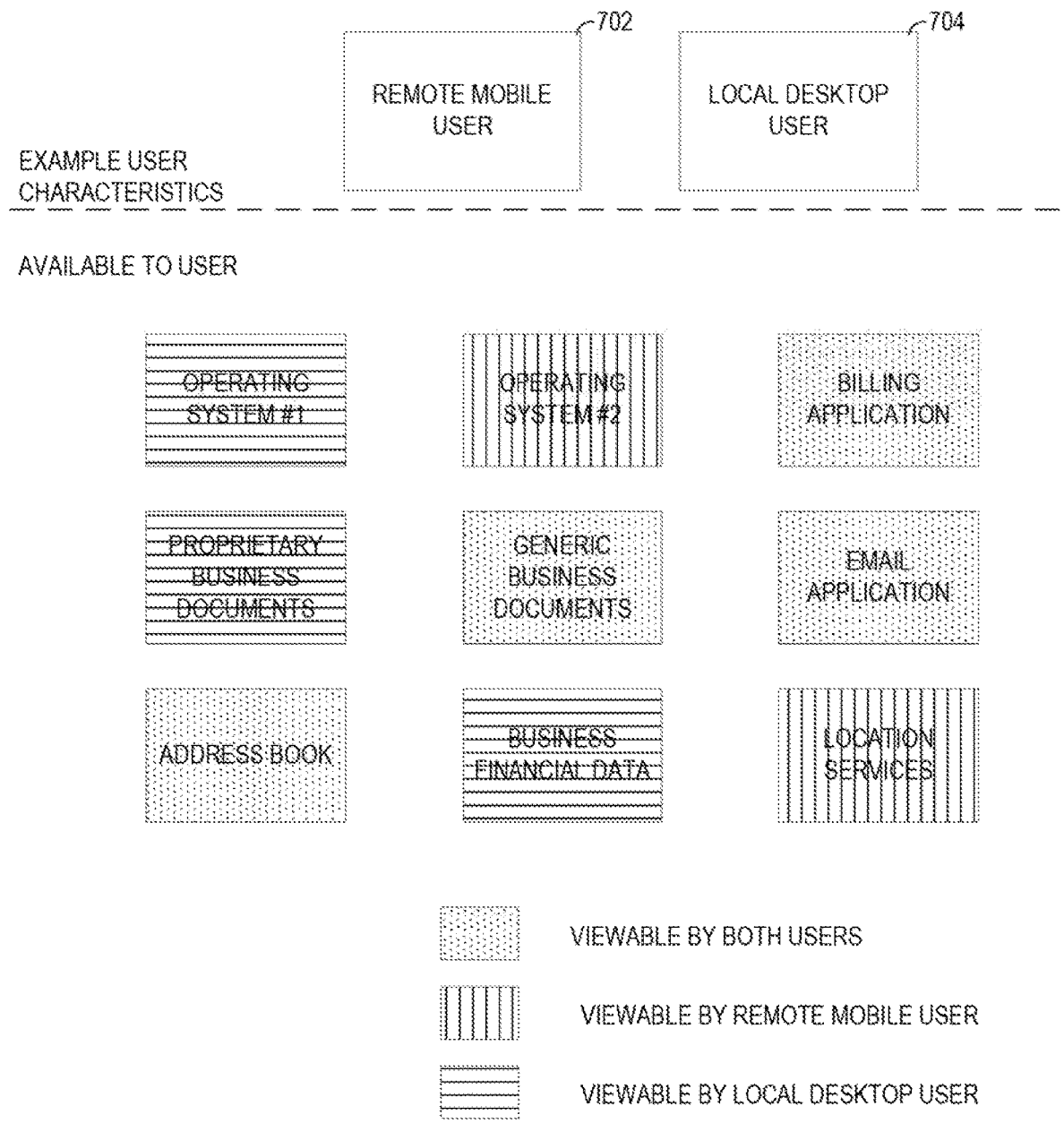
FIG. 7 is an example of the view that the dynamic filtering method provides to two different users.

FIG. 7 further illustrates the example described above, in FIG. 6. In FIG. 7, two examples of user characteristics are defined above the dashed line, while the applications 102 or files available to those users are illustrated below the dashed line. A remote mobile user 702 and a local desktop user 704 are the types of users illustrated. The remote mobile user 702 is operating on a mobile device, from a remote location while the local desktop user 704 is operating from a desktop at a local (e.g., work-related) location.

In the example of FIG. 7, the applications and files accessible to both users have a dotted background, those available to the remote mobile user 702 have a vertical striped background, and those available to the local desktop user 704 have a horizontal striped background. Several types of files and applications 102 are illustrated in FIG. 7. In the example of FIG. 7, both users access a billing application, email application, generic business documents, and an address book. However, the policy federated among these users limits access to sensitive data, such as proprietary business documents and business financial data to the local desktop user 704. Likewise, location services are only available to the remote mobile user 702. The policies, as applied in this example, dictate different applications and settings for mobile users vs. desktop users.

Figure 8:
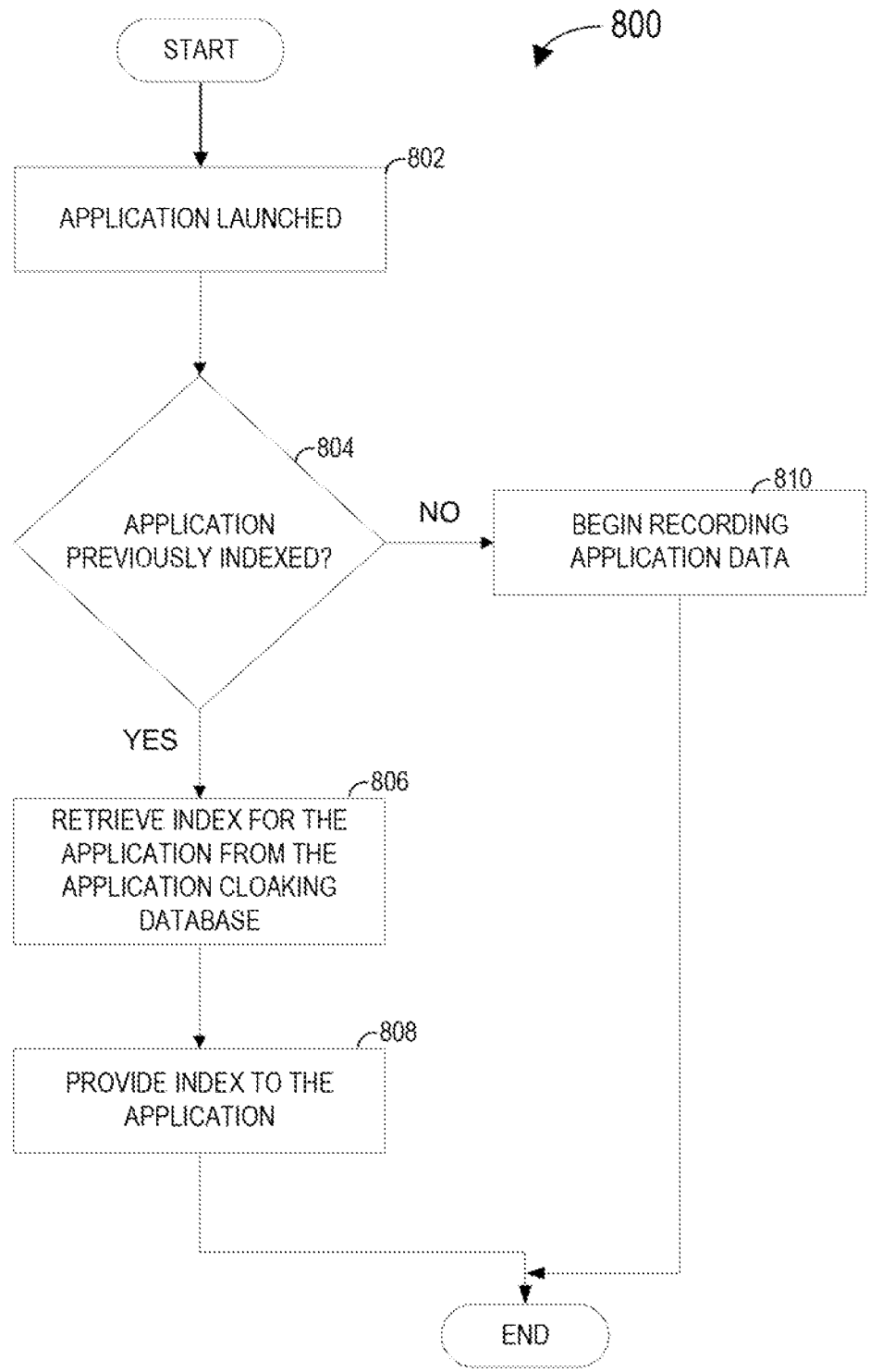
FIG. 8 is an example flowchart of a method of providing the index of registry or file keys to an application by the application virtualization engine.

FIG. 8 is an example flowchart of a method of providing the index of registry or file keys to an application by the application virtualization engine. In the example of FIG. 8, an application 102 is launched at 802. At 804, the application virtualization engine 118 determines whether the application 102 was previously indexed. The index, in some examples, contains the mapping of all the recorded data on the registry keys or files accessed, requested, or otherwise used by the application 102 in previous events such as launch and installation. If the application 102 was not previously indexed, then the application capture tool or the application virtualization engine 118 begins recording the file requests made by the application 102 at 810. An exemplary method of recording file requests to create the index is illustrated in FIG. 4. At 806, if the index already exists, it is retrieved from the application cloaking database 120. At 808 the index is provided to the application 102.

Figure 9:
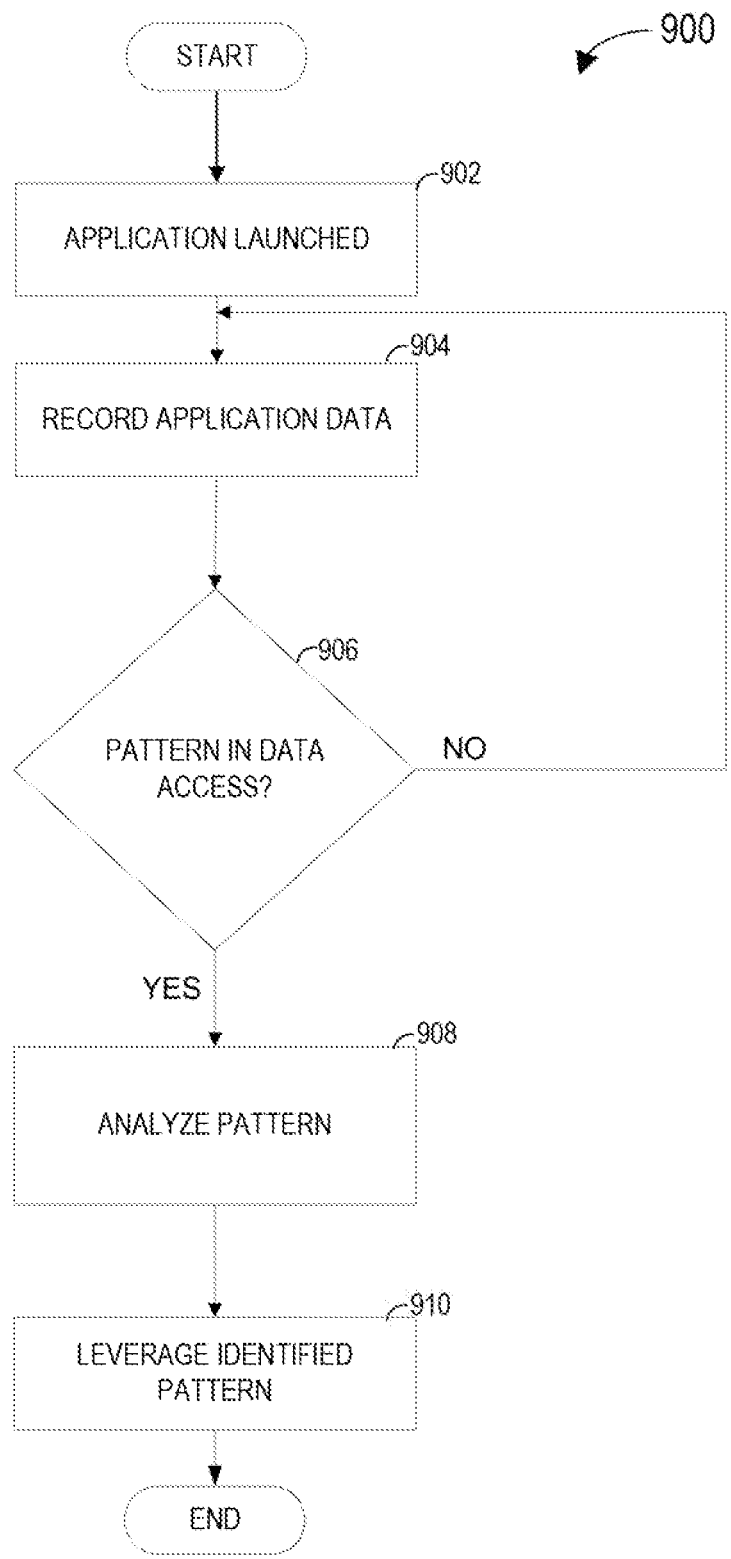
FIG. 9 is an example flowchart of a method of auditing application file or registry key access patterns by the application virtualization engine to optimize access to the underlying storage.

FIG. 9 is an example flowchart of a method of auditing or analyzing, by the application virtualization engine, the intercepted requests for application files or registry keys to find access patterns in order to optimize access to the underlying storage. In some examples, the application virtualization engine 118 anticipates the needs of the user and pre-loads or retrieves files. Specifically, the application capture tool or the application virtualization engine 118, after launch of the application 102 at 902, monitor, gather, and record usage and access patterns at 904. At 906 the recorded data is audited, to look for patterns in the data access and usage recordings. Any patterns discovered at 906 are analyzed at 908. The data analysis is used for making proactive performance enhancement of the underlying storage look-aside cache 126 efficiency, at 910, by intelligent pre-population of the same, or by placement of application 102 components optimally across different tiers of storage or registry keys. In some examples, in order to enhance application performance and improve user experience, file or configuration data is placed upon low latency storage media. Some examples of low latency storage media include flash memory, solid state disks (SSD), biological storage, optical storage, and hybrid arrays.

Thus, in some examples, if a pattern of launching an application 102 at a specific time by a user is identified, the application 102 file or registry keys may be pre-loaded in anticipation of the launch. In another example, based on the analysis a virtual hard drive 210 is composed based on files or registry keys used by an application 102. Composing the virtual hard drive 210 is used, for example, when a large set of registry keys or files are used exclusively by a subset of applications 102.

Figure 10:
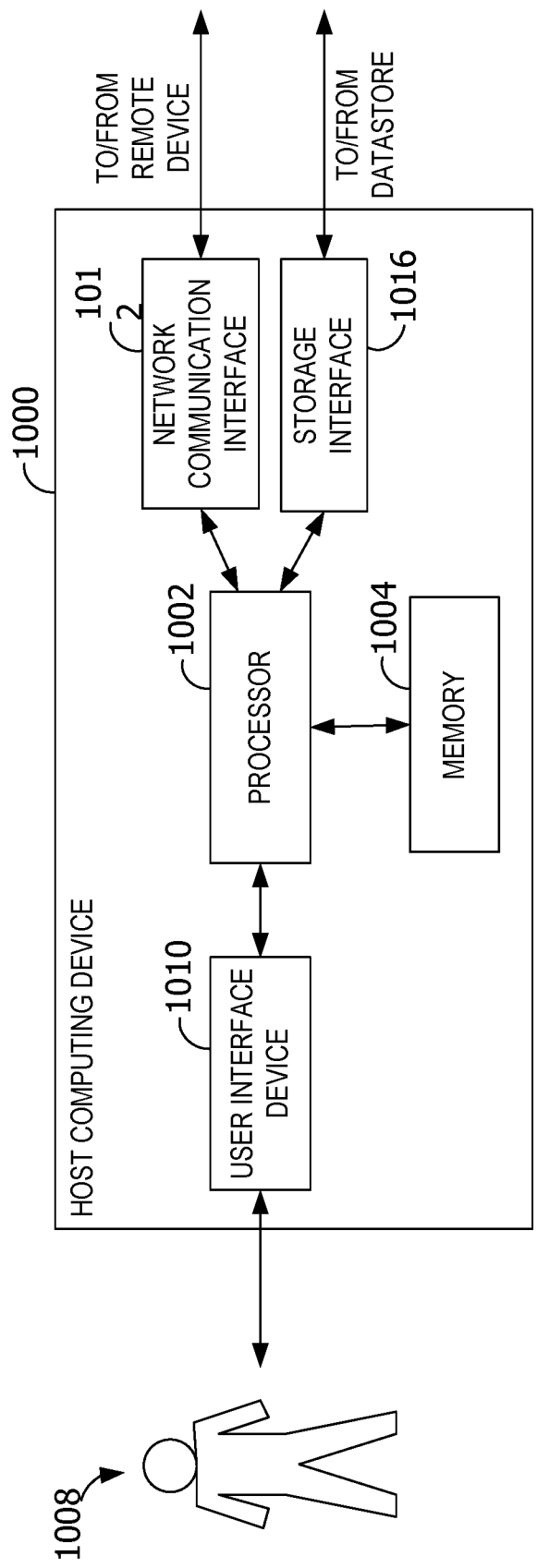
FIG. 10 is a block diagram of an example host computing device.

FIG. 10 is a block diagram of an example host computing device 1000. Host computing device 1000 includes a processor 1002 for executing instructions. In some examples, executable instructions are stored in a memory 1004. Memory 1004 is any device allowing information, such as executable instructions and/or other data, to be stored and retrieved. For example, memory 1004 may include one or more random access memory (RAM) modules, flash memory modules, hard disks, solid state disks, and/or optical disks.

Host computing device 1000 may include a user interface device 1010 for receiving data from a user 1008 and/or for presenting data to user 1008. User 1008 may interact indirectly with host computing device 1000 via another computing device such as a device running VMware's vCenter Server or other management device. User interface device 1010 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 1010 operates to receive data from user 1008, while another device (e.g., a presentation device) operates to present data to user 1008. In other examples, user interface device 1010 has a single component, such as a touch screen, that functions to both output data to user 1008 and receive data from user 1008. In such examples, user interface device 1010 operates as a presentation device for presenting information to user 1008. In such examples, user interface device 1010 represents any component capable of conveying information to user 1008. For example, user interface device 1010 may include, without limitation, a display device (e.g., a liquid crystal display (LCD), organic light emitting diode (OLED) display, or "electronic ink" display) and/or an audio output device (e.g., a speaker or headphones). In some examples, user interface device 1010 includes an output adapter, such as a video adapter and/or an audio adapter. An output adapter is operatively coupled to processor 1002 and configured to be operatively coupled to an output device, such as a display device or an audio output device.

Host computing device 1000 also includes a network communication interface 1012, which enables host computing device 1000 to communicate with a remote device (e.g., another computing device) via a communication medium, such as a wired or wireless packet network. For example, host computing device 1000 may transmit and/or receive data via network communication interface 1012. User interface device 1010 and/or network communication interface 1012 may be referred to collectively as an input interface and may be configured to receive information from user 1008.

Host computing device 1000 further includes a storage interface 1016 that enables host computing device 1000 to communicate with one or more data storage devices, which store virtual disk images, software applications, and/or any other data suitable for use with the methods described herein. In example examples, storage interface 1016 couples host computing device 1000 to a storage area network (SAN) (e.g., a Fibre Channel network) and/or to a network-attached storage (NAS) system (e.g., via a packet network). The storage interface 1016 may be integrated with network communication interface 1012.

Figure 11:
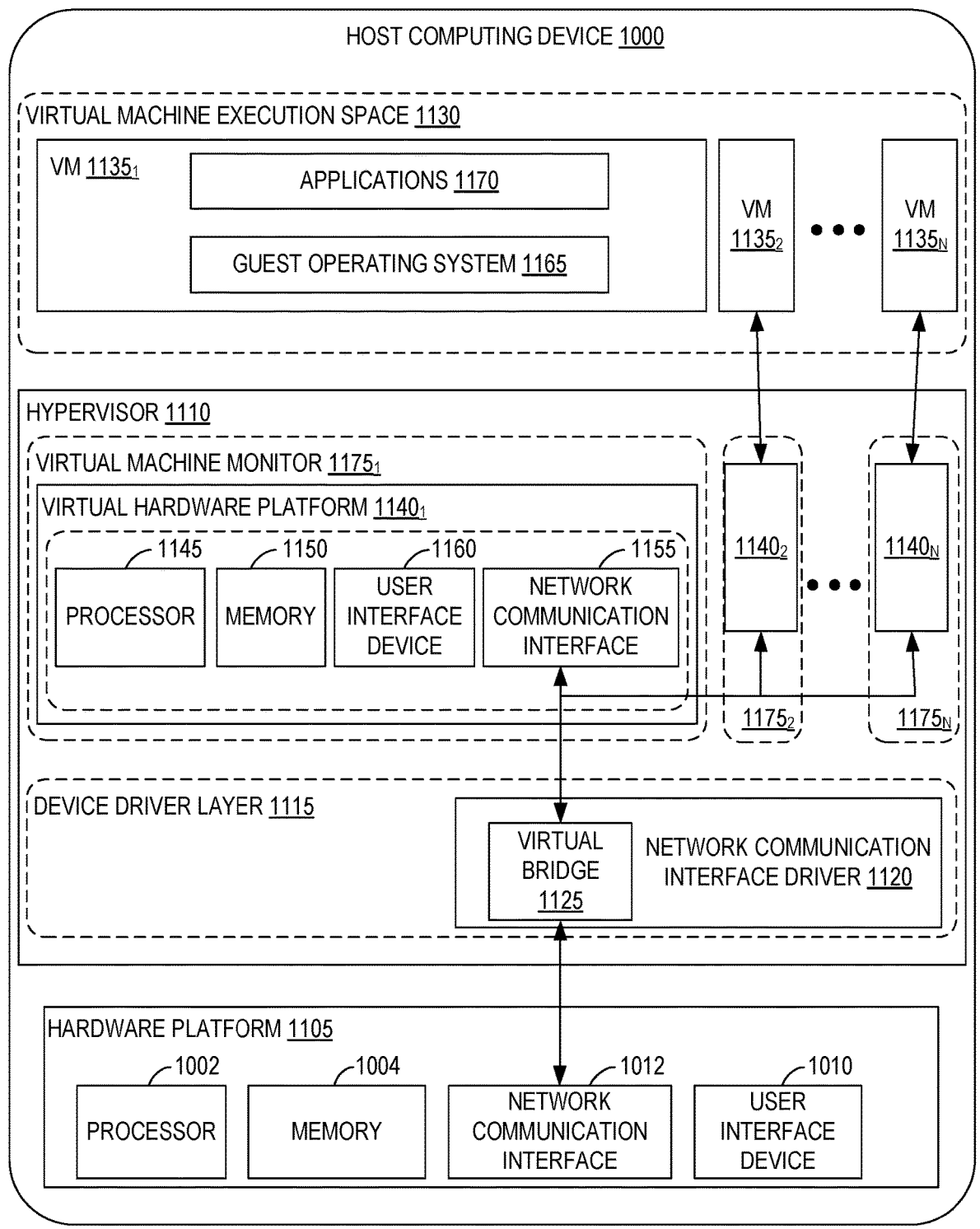
FIG. 11 depicts a block diagram of virtual machines that are instantiated on host computing device.

FIG. 11 depicts a block diagram of virtual machines $1135_1$, $1135_2$ . . . $1135_N$ that are instantiated on host computing device 1000. Host computing device 1000 includes a hardware platform 1105, such as an x86 architecture platform. Hardware platform 1105 may include processor 1002, memory 1004, network communication interface 1012, user interface device 1010, and other input/output (I/O) devices, such as a presentation device 1006 (shown in FIG. 10). A virtualization software layer, also referred to hereinafter as a hypervisor 1110, is installed on top of hardware platform 1105.

The virtualization software layer supports a virtual machine execution space 1130 within which multiple virtual machines (VMs $1135_1$-$1135_N$) may be concurrently instantiated and executed. Hypervisor 1110 includes a device driver layer 1115, and maps physical resources of hardware platform 1105 (e.g., processor 1002, memory 1004, network communication interface 1012, and/or user interface device 1010) to "virtual" resources of each of VMs $1135_1$-$1135_N$ such that each of VMs $1135_1$-$1135_N$ has its own virtual hardware platform (e.g., a corresponding one of virtual hardware platforms $1140_1$-$1140_N$), each virtual hardware platform having its own emulated hardware (such as a processor 1145, a memory 1150, a network communication interface 1155, a user interface device 1160 and other emulated I/O devices in VM $1135_1$). Hypervisor 1110 may manage (e.g., monitor, initiate, and/or terminate) execution of VMs $1135_1$-$1135_N$ according to policies associated with hypervisor 1110, such as a policy specifying that VMs $1135_1$-$1135_N$ are to be automatically restarted upon unexpected termination and/or upon initialization of hypervisor 1110. In addition, or alternatively, hypervisor 1110 may manage execution VMs $1135_1$-$1135_N$ based on requests received from a device other than host computing device 1000. For example, hypervisor 1110 may receive an execution instruction specifying the initiation of execution of first VM $1135_1$ from a management device via network communication interface 1012 and execute the execution instruction to initiate execution of first VM $1135_1$.

In some examples, memory 1150 in first virtual hardware platform $1140_1$ includes a virtual disk that is associated with or "mapped to" one or more virtual disk images stored on a disk (e.g., a hard disk or solid state disk) of host computing device 1000. The virtual disk image represents a file system (e.g., a hierarchy of directories and files) used by first VM $1135_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 1115 includes, for example, a communication interface driver 1120 that interacts with network communication interface 1012 to receive and transmit data from, for example, a local area network (LAN) connected to host computing device 1000. Communication interface driver 1120 also includes a virtual bridge 1125 that simulates the broadcasting of data packets in a physical network received from one communication interface (e.g., network communication interface 1012) to other communication interfaces (e.g., the virtual communication interfaces of VMs $1135_1$-$1135_N$). Each virtual communication interface for each VM $1135_1$-$1135_N$, such as network communication interface 1155 for first VM $1135_1$, may be assigned a unique virtual Media Access Control (MAC) address that enables virtual bridge 1125 to simulate the forwarding of incoming data packets from network communication interface 1012. In an example, network communication interface 1012 is an Ethernet adapter that is configured in "promiscuous mode" such that all Ethernet packets that it receives (rather than just Ethernet packets addressed to its own physical MAC address) are passed to virtual bridge 1125, which, in turn, is able to further forward the Ethernet packets to VMs $1135_1$-$1135_N$. This configuration enables an Ethernet packet that has a virtual MAC address as its destination address to properly reach the VM in host computing device 1000 with a virtual communication interface that corresponds to such virtual MAC address.

Virtual hardware platform $1140_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 1165 in order to execute applications 1170 for an instantiated VM, such as first VM $1135_1$. Virtual hardware platforms $1140_1$-$1140_N$ may be considered to be part of virtual machine monitors (VMM) $1175_1$-$1175_N$ that implement virtual system support to coordinate operations between hypervisor 1110 and corresponding VMs $1135_1$-$1135_N$. Those with ordinary skill in the art will recognize that the various terms, layers, and categorizations used to describe the virtualization components in FIG. 11 may be referred to differently without departing from their functionality or the spirit or scope of the disclosure. For example, virtual hardware platforms $1140_1$-$1140_N$ may also be considered to be separate from VMMs $1175_1$-$1175_N$, and VMMs $1175_1$-$1175_N$ may be considered to be separate from hypervisor 1110. One example of hypervisor 1110 that may be used in an example of the disclosure is included as a component in VMware's ESX brand software, which is commercially available from VMware, Inc.

Additional Examples

The following scenarios are merely exemplary and not intended to be limiting in any way.

Aspects of the disclosure enable various use cases, such as an application update, by turning on an upgraded versions of the application on demand. From the user perspective, when the user launches the application from the same icon as before the upgrade, the user in fact executes the updated version of the application. In some examples, rather than a partial or incremental update, an application may be replaced entirely with a different application (e.g., replace an application with an open source version of that application).

With some examples of the disclosure, a user switches between one device and another and sees the same desktop on each device, but the applications underlying the launch icons are different (e.g., specific to the device). In this manner, aspects of the disclosure enable user environment management. An agent in the desktop is aware of environmental context and triggers policies and events, such as changing the view.

Aspects of the disclosure also contemplate live deletion of an application. For example, an application may be dynamically hidden if the user changes to a new network or security context.

In some examples, when a file is needed by an application 102, the application virtualization engine 118 checks the application cloaking database 120 which reviews or checks the key-value table in the look-aside cache 126 in order to leverage content which has already been accessed or mounted. If possible, the application virtualization engine 118 obtains the local file loaded if a copy exists on disks already mounted to the OS, such as the look-aside cache 126. In other examples, the application virtualization engine 118 also causes the mount of additional content from an SBD disk (for example VHD or VMDK based), if there is a copy on nearby data stores. If the OS might go offline without networking (e.g., it is a physical machine), the application virtualization engine 118 may request that supporting servers compose a real VHD disk which contains all the latest portions needed for this application, then download said VHD disk to the local disk so that it may be attached to the OS at any time.

Making files appear instantly improves user experience, making any loading, updates, etc. less disruptive and more efficient in terms of resource utilization and performance. Existing solutions fail to achieve rapid application package delivery because they often transfer a certain amount of application content from a source location across the network and into the OS before the application may launch. The file based virtualization approach here described enables omission of the heavy network and disk transfer operations normally involved in traditional streaming file based virtualized application delivery.

Another example of the disclosure is a background service doing analysis plus correlation on the application file data, removing duplicates, maintaining distributions, high availability, backup or recovery, patch the data if needed or even move the files between different registered storage providers in a manner optimal for each use case. In some examples, the background service runs in the cloud, locally, or remotely. It collects data regarding which applications 102 share files, frequency of use, etc.

Aspects of the disclosure are operable with various technologies, including deduplication such as described in U.S. Pat. No. 8,626,723 entitled "Storage-Network De-Duplication", synthetic devices or data blocks such as described in U.S. Patent Publication No. 2015/0121059 entitled "Synthetic Device for Installation Source Media", attachable applications such as described in a pending U.S. Patent Application entitled "Indexing Attachable Applications for Computing Systems", and application volumes such as described in U.S. Patent Publication No. 2012/0174096 entitled "Systems and Methods to Load Applications and Application Data Into a Virtual Machine Using Hypervisor-Attached Volumes", all of which are incorporated by reference herein.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or the like. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for application virtualization, including exemplary means for performing the operations recited in the Claims and/or described herein.

The examples illustrated and described herein as well as examples not specifically described herein but within the scope of aspects of the disclosure constitute exemplary means for application virtualization. For example, the elements illustrated in FIGS. 1, 2, 10, and/or 11, such as when encoded to perform the operations illustrated in FIGS. 3, 4, 5, 6, 8, and/or 9, constitute exemplary means for intercepting a request for a file or registry key from at least one of a plurality of applications, exemplary means for searching a look-aside cache for the intercepted file or registry key, exemplary means for adjusting a filter to reveal a cached copy of the file or registry key to the at least one of the plurality of applications if the intercepted file or registry key is in the look-aside cache, and exemplary means for retrieving the file or registry key from underlying storage and updating the look-aside cache with the retrieved file or registry key if the intercepted file or registry key is not in the look-aside cache.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A computing system for conserving space for application virtualization, the computing system comprising:
   a database that maps associations between a plurality of applications and their respective files on a host, and records data indicating that at least two applications of the plurality of applications share a file required by the at least two applications during installation; and an application virtualization engine running on the host, that:
  receives a notification that an application installing event of a first application of the at least two applications, is occurring on the host;
  determines that files from the application installing event of the first application have not been recorded in the database;
  in response to the determining that files from the application installing event of the first application have not been recorded in the database, records the files from the application installing event of the first application;
  indexes the recorded files in the database to map the associations; and
  subsequently, during an application installing event, on the host, of a second application of the at least two applications:
intercepts a request to install a file required for the second application from the application installing event of the second application;
determines that the required file is not the shared file;
  in response to the determining that the required file is not the shared file, checks the files recorded from the application installing event of the first application to determine that the file has been indexed in the database; and
based on determining that the required file has been indexed in the database from the application installing event of the first application:
adjusts a filter to make the required file available to the second application, wherein adjusting the filter comprises changing the required file from an older version of the required file to an upgraded version of the required file; and while maintaining only one copy of the required file, represents the required file as residing in a first location accessible to the first application and represents the required file as also residing in a second location accessible to the second application.

2. The computing system of claim 1, wherein the computing system includes a multiuser operating system (OS) enabling a plurality of users to use the multiuser OS and each user of the plurality of users is provided a unique view of applications of the plurality of applications installed and available within the multiuser OS for use of the user.

3. The computing system of claim 1, wherein the second application is updated in place by the application virtualization engine updating one or more files associated with the second application to enable installation of an updated second application.

4. The computing system of claim 1, wherein upon a launch of at least one of the plurality of applications, the application virtualization engine further:
  compares one or more user criteria with a set of policies to determine that the one or more user criteria triggers a policy from the set; and
  changes a version of the first application or the second application for use by a user.

5. The computing system of claim 1, further comprising:
  merging the database with another mapping database to create a master database, the master database routing requests between the second application of the plurality of applications and an underlying storage.

6. The computing system of claim 1, wherein the file is shared by a plurality of remote desktop sessions, while appearing different to each of the plurality of remote desktop sessions.

7. The computing system of claim 1, wherein at least one of the plurality of applications shares access to the file.

8. The computing system of claim 1, wherein the application virtualization engine further:
  predicts a need for one or more files based on application file access patterns of the file; and
  proactively pre-populates a cache based on the predicted need for the one or more files.

9. A method to conserve space for application virtualization, the method comprising:
  providing a database that maps associations between a plurality of applications and their respective files on a host, and records data indicating that at least two applications of the plurality of applications share at least one file required by the at least two applications during installation;
  receiving a notification that an application installing event of a first application of the at least two applications, is occurring on the host;
  determining that files from the application installing event of the first application have not been recorded in the database;
  in response to the determining that files from the application installing event of the first application have not been recorded in the database, recording files from the application installing event of the first application;
  indexing the recorded files in the database to map the associations; and
  subsequently, during an application installing event of a second application of the at least two applications, on the host:
    intercepting, by an application virtualization engine running on the host, a request to install a file required for the second application from the application installing event of the second application;
    determining that the required file is not the shared file;
    in response to the determining that the required file is not the shared file, checking the files recorded from the application installing event of the first application to determine that the required file has been indexed in the database; and
    based on determining that the required file has been indexed in the database from the application installing event of the first application:
      adjusting a filter to make the required file available to the second application, wherein adjusting the filter comprises changing the required file from an older version of the required file to an upgraded version of the required file; and
      while maintaining only one copy of the required file on the host, representing the required file as residing in a first location accessible to the first application and representing the required file as also residing in a second location accessible to the second application.

10. The method of claim 9, wherein the adjusting the filter comprises pointing the first application and the second application to the one copy of the required file on the host for all users.

11. The method of claim 10, further comprising:
  providing a multiuser operating system (OS) enabling a plurality of users to use the OS and each user of the plurality of users is provided a unique view of applications of the plurality of applications installed and available within the multiuser OS for use of the user.

12. The method of claim 9, wherein adjusting the filter is based on a policy related to a remote desktop session user.

13. The method of claim 9, further comprising:
recording intercepted requests for the file;
analyzing the intercepted requests to determine application file access patterns;
predicting a need for one or more files based on the determined application file access patterns; and
proactively pre-populating a cache based on the predicted need for the one or more files.

14. The method of claim 9, wherein the file is shared by a plurality of remote desktop sessions, while appearing different to each of the plurality of remote desktop sessions.

15. The method of claim 9, further comprising:
comparing one or more user criteria with a set of policies to determine that the one or more user criteria triggers a policy from the set; and
changing a version of the first application or the second application for use by a user.

16. A non-transitory computer-readable medium including instructions that, when executed by an application virtualization engine running on a host, conserve space for application virtualization, by causing at least one processor to perform operations comprising:
providing a database that maps associations between a plurality of applications and their respective files on the host, and records data indicating that at least two applications of the plurality of applications share at least one file required by the at least two applications during installation;
receiving a notification that an application installing event of a first application of the at least two applications is occurring on the host;
determining that files from the application installing event of the first application have not been recorded in the database;
in response to the determining that files from the application installing event of the first application have not been recorded in the database, recording files from the application installing event of the first application;
indexing the recorded files in the database to map the associations; and
subsequently, during an application installing event of a second application of the at least two applications on the host:
intercepting a request to install a file required for the application installing event of the second application;
determining that the required file is not the shared file;
in response to the determining that the required file is not the shared file, checking the files recorded from the application installing event of the first application to determine that the required file has been indexed in the database; and
based on determining that the required file has been indexed in the database from the application installing event of the first application:
making available the required file to the second application; and
adjusting a filter to make the required file available to the second application, wherein adjusting the filter comprises changing the required file from an older version of the required file to an upgraded version of the required file; and
while maintaining only one copy of the required file on the host, representing the required file as residing in a first location accessible to the first application and representing the required file as also residing in a second location accessible to the second application.

17. The non-transitory computer-readable medium of claim 16, further comprising instructions for composing a virtual hard drive containing the file used by the second application.

18. The non-transitory computer-readable medium of claim 16, further comprising:
comparing one or more user criteria with a set of policies to determine that the one or more user criteria triggers a policy from the set; and
changing a version of the first application or the second application for use by a user.

19. The non-transitory computer-readable medium of claim 16, further comprising providing a multiuser operating system (OS) enabling a plurality of users to use the OS and each user of the plurality of users is provided a unique view of applications of the plurality of applications installed and available within the multiuser OS for use of the user.

\* \* \* \* \*